(12) United States Patent
Suzuki

(10) Patent No.: US 10,394,509 B2
(45) Date of Patent: Aug. 27, 2019

(54) DISPLAY LIST GENERATION APPARATUS

(71) Applicant: CANON KABUSHIKI KAISHA, Tokyo (JP)

(72) Inventor: Ryousuke Suzuki, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/864,575

(22) Filed: Sep. 24, 2015

(65) Prior Publication Data

US 2016/0011837 A1    Jan. 14, 2016

Related U.S. Application Data

(63) Continuation of application No. 14/335,536, filed on Jul. 18, 2014, now Pat. No. 9,171,240.

(30) Foreign Application Priority Data

Jul. 22, 2013 (JP) ................. 2013-151655

(51) Int. Cl.
*G06F 3/12* (2006.01)
*H04N 1/21* (2006.01)
(Continued)

(52) U.S. Cl.
CPC .......... *G06F 3/1298* (2013.01); *G06F 3/1217* (2013.01); *G06F 3/1227* (2013.01);
(Continued)

(58) Field of Classification Search
CPC ....... G06F 3/1217; G06F 3/1298; H04N 1/21; H04N 1/32454
(Continued)

(56) References Cited

U.S. PATENT DOCUMENTS 6,483,604 B1 * 11/2002 Gerstenberger ... H04N 1/32379
358/1.16
2004/0246502 A1 * 12/2004 Jacobsen ................ G06K 15/02
358/1.1
(Continued)

FOREIGN PATENT DOCUMENTS

JP    2012-086450 A    *    5/2012

OTHER PUBLICATIONS

Enlgish language machine translation of JP 2012-086450 A to Suzuki.*

*Primary Examiner* — Eric A. Rust
(74) *Attorney, Agent, or Firm* — Canon U.S.A., Inc. IP Division

(57) ABSTRACT

A display list generation apparatus includes an interpretation unit configured to interpret page description language (PDL) data and store an interpretation result of the PDL data in a first storage unit, a copying unit configured to copy the interpretation result stored in the first storage unit, in a second storage unit, and a generation unit configured to generate a display list from the interpretation result stored in the first storage unit in a case where a data size of the interpretation result exceeds a predetermined threshold and generate a display list from the copy of the interpretation result stored in the second storage unit in a case where the data size of the interpretation result does not exceed the predetermined threshold.

7 Claims, 9 Drawing Sheets

(51) Int. Cl.
*G06K 15/00* (2006.01)
*G06K 15/02* (2006.01)

(52) U.S. Cl.
CPC ..... *G06K 15/1813* (2013.01); *G06K 15/4005* (2013.01); *H04N 1/21* (2013.01)

(58) Field of Classification Search
USPC .............................................. 358/1.16, 1.15
See application file for complete search history.

(56) References Cited

U.S. PATENT DOCUMENTS

| | | | | |
|---|---|---|---|---|
| 2007/0282928 | A1* | 12/2007 | Jiao | G06F 9/485 |
| 2010/0128309 | A1* | 5/2010 | Matoba | G06K 15/005 |
| | | | | 358/1.15 |
| 2010/0153646 | A1* | 6/2010 | Chen | G06F 12/0897 |
| | | | | 711/122 |
| 2014/0118795 | A1* | 5/2014 | Kusumoto | H04N 1/00018 |
| | | | | 358/406 |

\* cited by examiner

FIG.2A
FIG.2B
FIG.2C
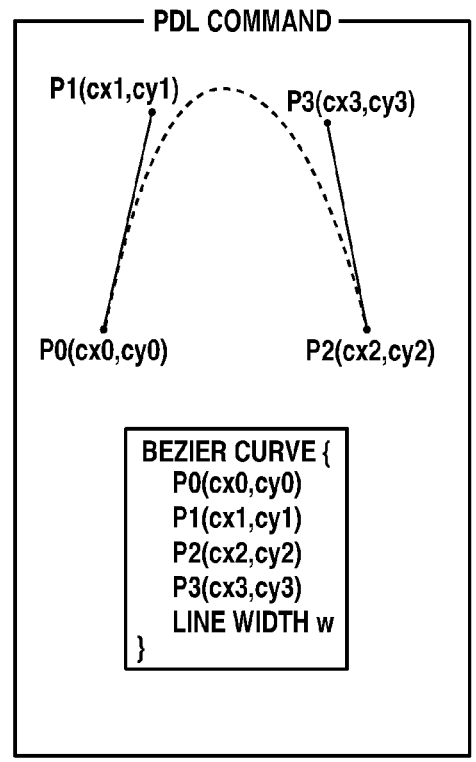
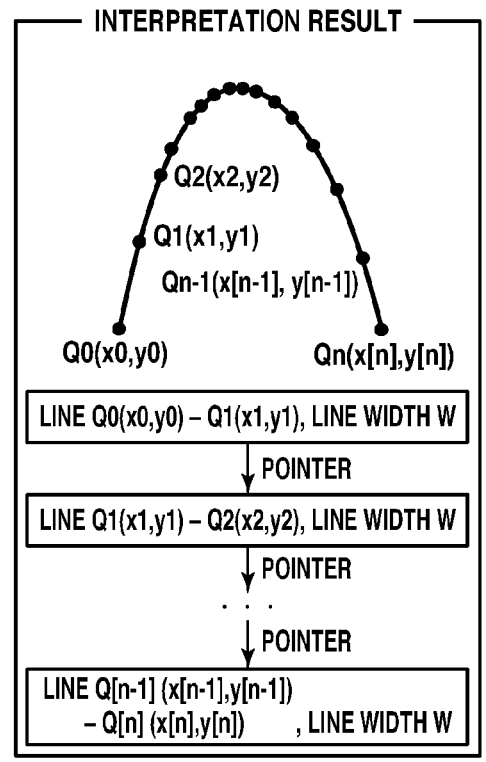
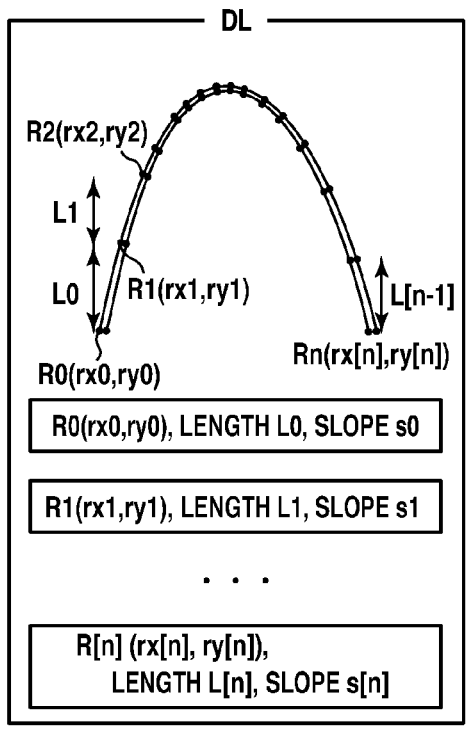

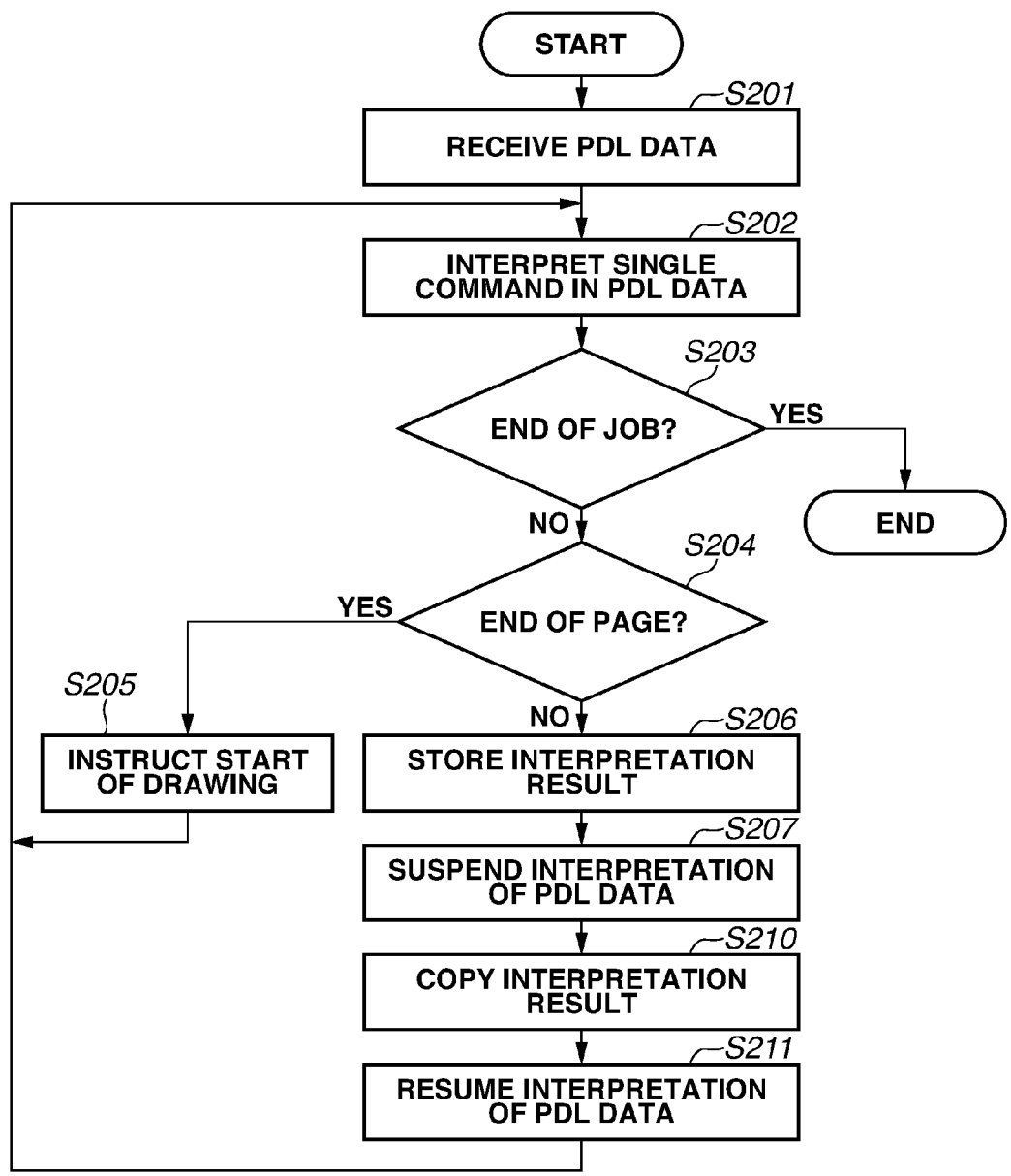

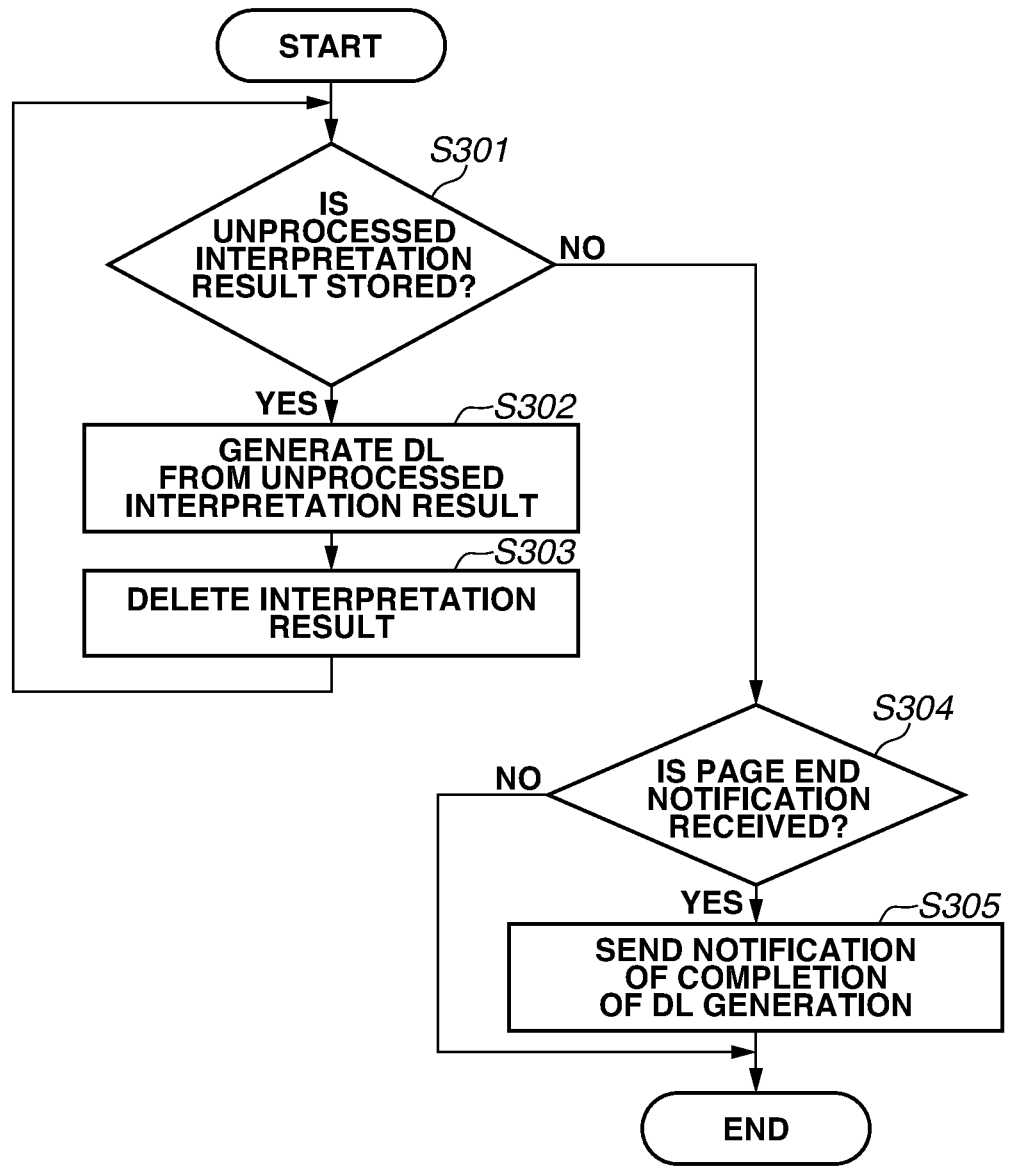

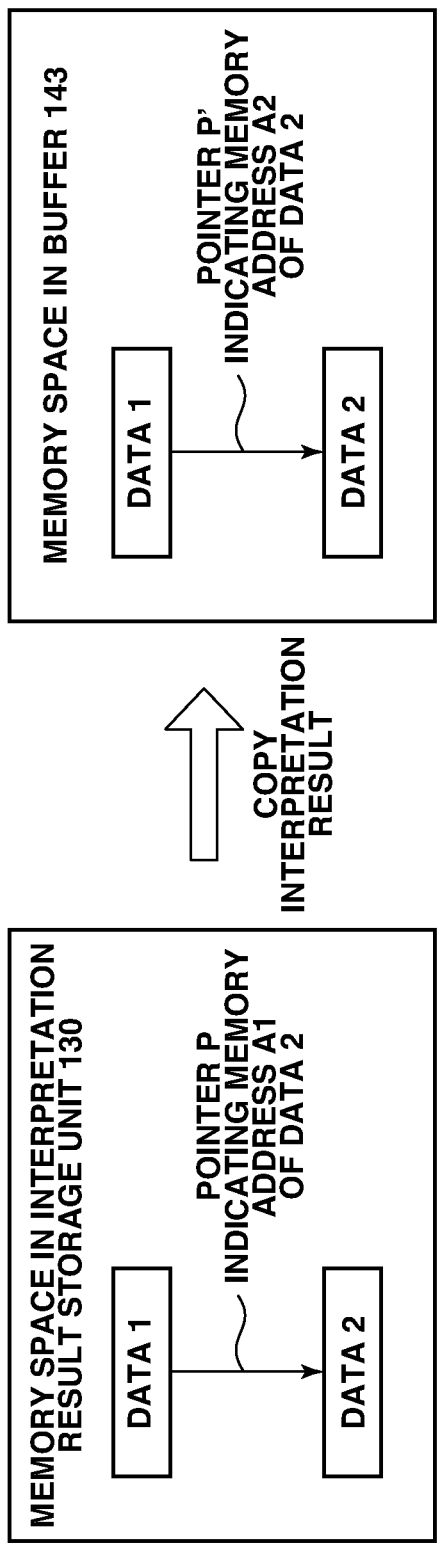

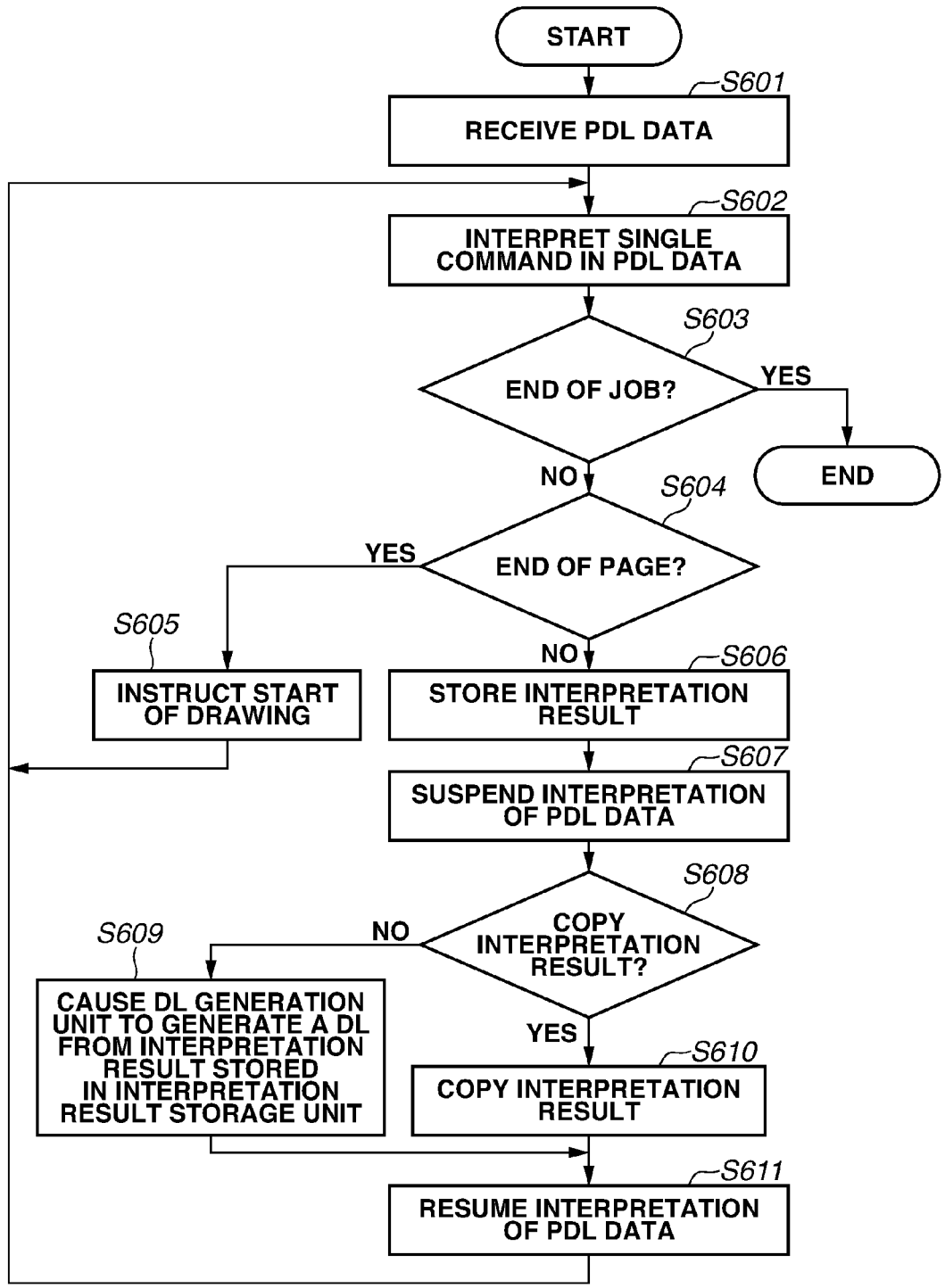

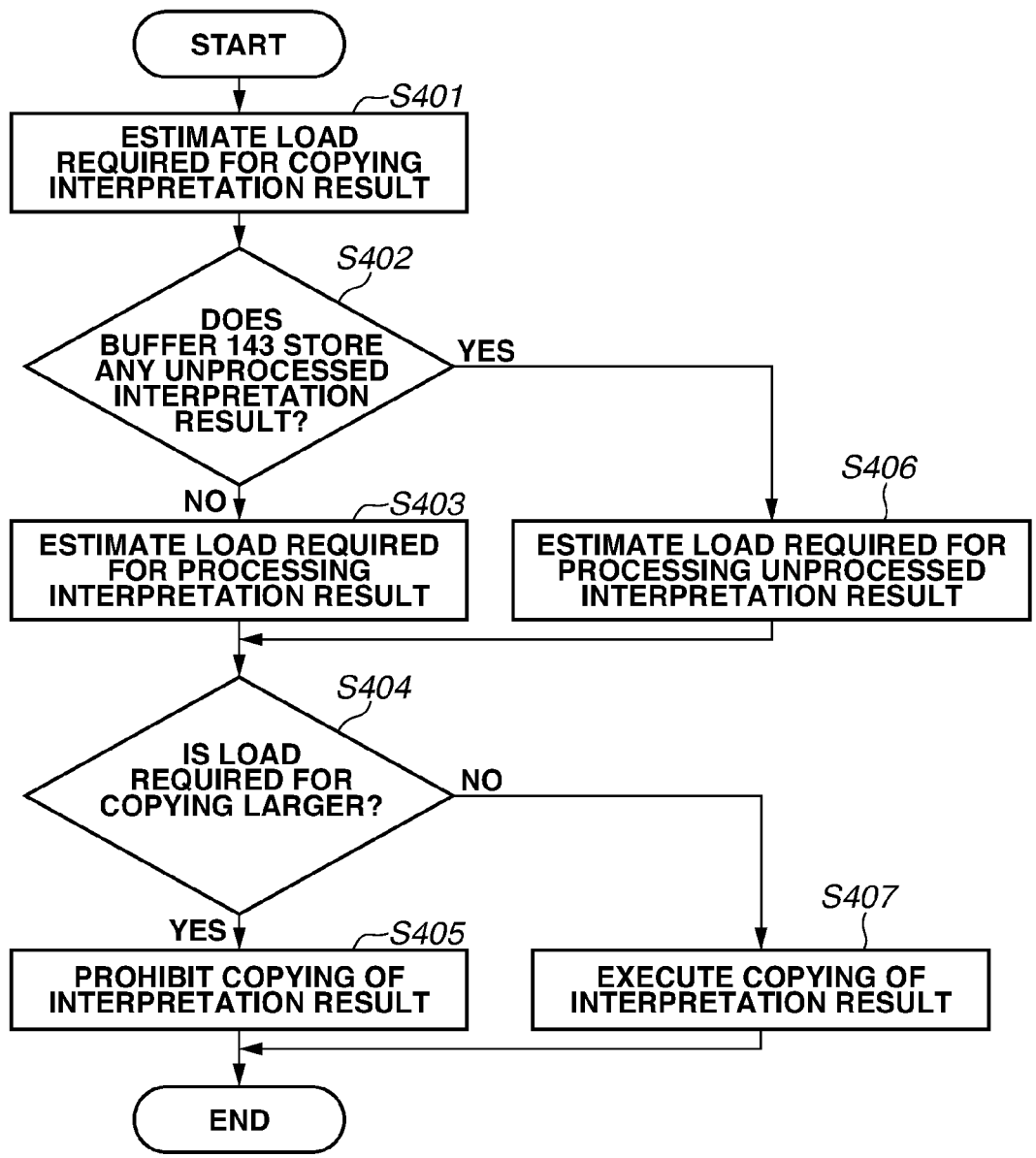

PRIOR ART

DISPLAY LIST GENERATION APPARATUS

CROSS-REFERENCE TO RELATED APPLICATION

This application is a Continuation of U.S. application Ser. No. 14/335536, filed Jul. 18, 2014, which claims priority from Japanese Patent Application No. 2013-151655 filed Jul. 22, 2013, which are hereby incorporated by reference herein in their entireties.

BACKGROUND OF THE INVENTION

Field of the Invention

The present invention relates to a technique for generating a display list.

Description of the Related Art

Japanese Patent Application Laid-Open No. 2012-86450 discusses an apparatus for generating from page description language (PDL) data intermediate data called a display list (DL) that can be processed by a rendering unit. In this apparatus, a PDL interpretation unit interprets PDL data and a DL generation unit generates a DL from a result of the interpretation. Next, the rendering unit executes a rendering operation on the basis of the generated DL to generate a bitmap image.

Hereinafter, a case as illustrated in FIG. 9 where an interpretation result storage unit used for sending a PDL data interpretation result to a DL generation unit has a very small storage capacity will be considered. For example, an interpretation result storage unit will be considered which may have a storage capacity that can only store the interpretation result of one PDL command included in PDL data.

In this case, it is required that, while the DL generation unit is accessing the interpretation result storage unit and is generating a DL from the interpretation result of a single command, the content of the interpretation result is not changed. Thus, while the DL generation unit is accessing the interpretation result storage unit, the PDL interpretation unit does not access the interpretation result storage unit. As a result, while the DL generation unit is accessing the interpretation result storage unit, the PDL interpretation unit does not access this interpretation result storage unit. More specifically, the PDL interpretation unit cannot overwrite the current interpretation result with an interpretation result of the next PDL command in the interpretation result storage unit. Namely, since the PDL interpretation unit and the DL generation unit execute the processing in synchronization with each other, delay in the processing by the DL generation unit directly results in delay in the processing by the PDL interpretation unit.

SUMMARY OF THE INVENTION

A display list generation apparatus includes an interpretation unit configured to interpret page description language (PDL) data and store an interpretation result of the PDL data in a first storage unit, a copying unit configured to copy the interpretation result stored in the first storage unit, in a second storage unit, and a generation unit configured to generate a display list from the interpretation result stored in the first storage unit in a case where a data size of the interpretation result exceeds a predetermined threshold and generate a display list from the copy of the interpretation result stored in the second storage unit in a case where the data size of the interpretation result does not exceed the predetermined threshold.

Further features of the present invention will become apparent from the following description of exemplary embodiments with reference to the attached drawings.

BRIEF DESCRIPTION OF THE DRAWINGS

FIGS. 2A, 2B, and 2C illustrate a PDL command, an interpretation result, and a DL, respectively.

FIG. 3 is a flowchart illustrating PDL data interpretation processing according to a first exemplary embodiment.

FIG. 4 is a flowchart illustrating DL generation processing.

FIG. 5 illustrates interpretation result copy processing.

FIG. 6 is a flowchart illustrating PDL data interpretation processing according to a second exemplary embodiment.

FIG. 7 is a flowchart illustrating processing for determining whether to execute interpretation result copy processing.

DESCRIPTION OF THE EMBODIMENTS

Various exemplary embodiments, features, and aspects of the invention will be described in detail below with reference to the drawings.

Next, exemplary embodiments of the present invention will be described with reference to the drawings.

<Configuration of Printer Controller>

Figure 1:
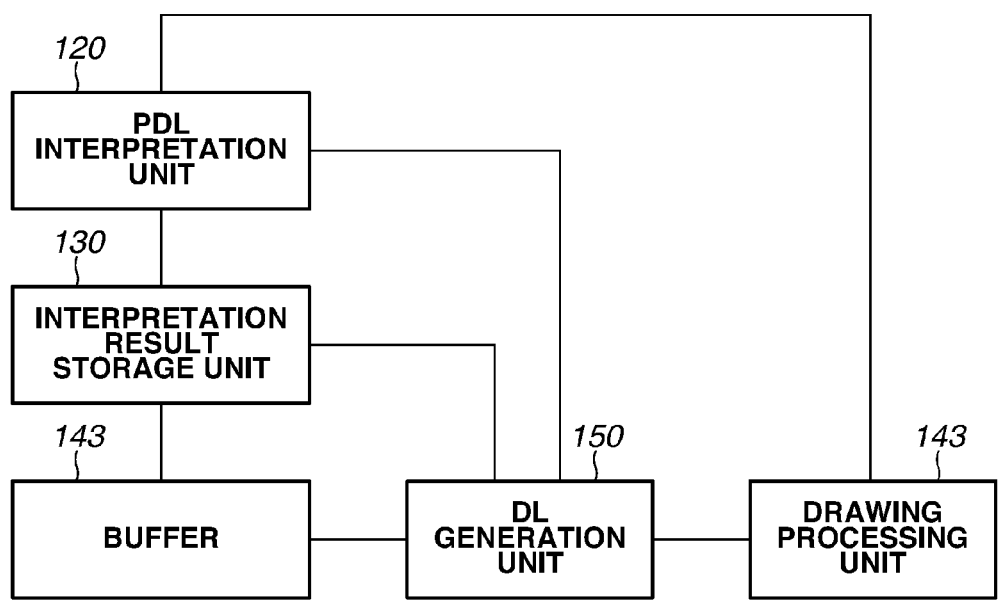
FIG. 1 is a block diagram illustrating a hardware configuration of a printer controller.

FIG. 1 illustrates a hardware configuration of a printer controller in a printing apparatus according to a first exemplary embodiment. In this printer controller, an interpretation result storage unit 130 is connected to a buffer 143 and stores a copy of a PDL data interpretation result stored by a PDL interpretation unit 120 in the buffer 143. With this configuration, even when a DL generation unit 150 is generating a DL from the copy of the interpretation result stored in the buffer 143, the PDL interpretation unit 120 can store a PDL data interpretation result in the interpretation result storage unit 130. Next, this operation will be described in detail.

The printing apparatus may be a single function printer (SFP) or a multi function peripheral (MFP). First, processing of this printer controller will be summarized. The printer controller according to the present exemplary embodiment can also serve as a display list generation apparatus, as will become apparent below.

Each block illustrated in FIG. 1 represents hardware of a unit and each line that connects blocks represents a signal line connecting each unit. Each unit exchanges information with other units via these signal lines.

The PDL interpretation unit 120 receives PDL data in a plurality of types of PDL formats (for example, Printer Command Language (PCL) (registered trademark) or PostScript (registered trademark)) from an external apparatus via a network interface I/F (not illustrated). The PDL interpretation unit 120 executes processing of a flowchart illustrated in FIG. 3. Namely, the PDL interpretation unit 120 can interprets PDL data in a plurality of PDL formats.

The interpretation result storage unit 130 includes a volatile memory having a storage area for storing an interpretation result of a command (PDL command) included in PDL data interpreted by the PDL interpretation unit 120. The interpretation result storage unit 130 copies this interpretation result in the buffer 143. The storage capacity of the interpretation result storage unit 130 according to the present exemplary embodiment corresponds to the maximum value (fixed size) of the amount of the interpretation result of a single PDL command. This interpretation result storage unit 130 stores the interpretation result of a single PDL command, not the interpretation results of two or more PDL commands.

The buffer 143 includes a volatile memory having a storage area for storing a copy of the interpretation result stored in the interpretation result storage unit 130. The buffer 143 according to the present exemplary embodiment is a ring buffer. The storage capacity of the buffer 143 has a fixed size larger than that of the interpretation result storage unit 130.

The DL generation unit 150 executes processing of a flowchart illustrated in FIG. 4.

When a rendering unit 170 is instructed to start rendering processing by the PDL interpretation unit 120 and is notified of completion of generation of a display list (DL) of one page by the DL generation unit 150, the rendering unit 170 receives the DL of one page from the DL generation unit 150. Next, the rendering unit 170 generates a bitmap image from the DL. Processing for generating a bitmap image from a DL is referred to as rendering processing.

The bitmap image generated by the rendering processing is transmitted to a printer engine (not illustrated) included in the printing apparatus according to the present exemplary embodiment and is printed on a sheet recording medium such as paper by the printer engine. Subsequently, the printed recording medium is discharged as a print product to the outside of the printing apparatus. As this printer engine, an arbitrary type of printer engine may be used such as an electrophotographic printer engine or an ink-jet printer engine.

<PDL Command, Interpretation Result, DL>

Generally, the PDL data includes a plurality of PDL commands. The PDL command is a command specifying the end of a print job, a command specifying a page break, or a command (rendering command) specifying rendering of an object.

FIGS. 2A to 2C conceptually illustrate a PDL command (a rendering command), an interpretation result of the PDL command, and a DL generated by the interpretation result, respectively. In FIG. 2A, a rendering command for a Bezier curve is illustrated. Differences among these PDL command, interpretation result, and DL will be described with reference to the examples in FIGS. 2A to 2C.

The PDL command (rendering command) for rendering a Bezier curve indicated by a dashed line in FIG. 2A specifies four control points (P0, P1, P2, P3) of the Bezier curve, a line width (w) of the Bezier curve, and a line color of the Bezier curve. Different rendering command formats of different PDL types (for example, PCL (registered trademark) or PostScript (registered trademark)), can be used to obtain the same rendering result.

The PDL interpretation unit 120 interprets this rendering command and approximately represents the Bezier curve indicated by the dashed line by using a plurality of lines. Each of these lines is defined by coordinates of both ends thereof. For example, as illustrated in FIG. 2B, line Q0-Q1 is a line that connects point Q0 represented by coordinates (x0, y0) and point Q1 represented by coordinates (x1, y1) and that has the line width (w).

In addition, data (interpretation result) representing these lines is stored in the interpretation result storage unit 130. Connected lines are linked to each other by pointers and have a link configuration. For example, the data representing line Q0-Q1 stored in the interpretation result storage unit 130 has a pointer indicating a memory address in the interpretation result storage unit 130 in which data representing line Q1-Q2 is stored. Each data representing a corresponding line has information representing the width of and the color of the line (color of the Bezier curve). This interpretation result is data in unique format that does not depend on a PDL type in a case where the same rendering result can be obtained.

The DL generation unit 150 generates a DL from an interpretation result, which is data representing a plurality of lines having a line width. In this example, the DL is formed by logical line objects, each of which is associated with a color and does not have a line width. In this example, more specifically, a single line in an interpretation result that is painted in a line color and that has a line width is locally a rectangle that is painted in a line color. In this DL, each of the four sides forming the contour of the rectangle is treated as a single object. For example, in the DL illustrated in FIG. 2C, line R0-R1, which is the left side of line Q0-Q1 having line width w in the interpretation result, is treated as a single object with which a line color is associated and that does not have a line width. This single object in the DL is defined by the start point of the line, the height (length) in y direction of the line, the slope of the line, and the color associated with the line. For example, in the case of line R0-R1, information representing start point R1 of the line, height L0 in y direction, slope s0 of the line, and the color of the line (color of the Bezier curve) is included in the DL.

Thus, a DL is intermediate data in a format in which an object (for example, a Bezier curve) specified by a single rendering command (for example, a rendering command for the Bezier curve) is represented by one or more simple objects each of which is a unit that can be processed by the rendering unit 170.

By rendering objects (for example, lines) included in this DL, the rendering unit 170 generates a bitmap image of the single object (for example, the Bezier curve) specified by the rendering command. For example, this bitmap image is an image formed by painting the inside of the contour indicated by the DL in FIG. 2C in the color of the Bezier curve.

As described above, first, an interpretation result is generated from a PDL command, and next, a DL is generated from the interpretation result. Finally, a bitmap image is generated from the DL. The interpretation result generated from the PDL command is data in a common format that does not depend on the type of PDL data (for example, PCL (registered trademark), PostScript (registered trademark), etc.). Since common data format is used, the DL generation unit 150 can easily generate a DL even if different types of PDL command are used. To generate such common format data from a PDL command, the PDL interpretation unit 120 includes a plurality of circuits corresponding to PDL data types.

<Operation of Printer Controller>

Next, operations of the printer controller according to the first exemplary embodiment will be described with reference the flowcharts in FIGS. 3 and 4.

<Interpretation of PDL Data>

FIG. 3 is a flowchart of PDL data interpretation processing executed by the PDL interpretation unit 120 and the interpretation result storage unit 130.

In step S201, the PDL interpretation unit 120 receives PDL data including a plurality of PDL commands from the outside via the network I/F.

Next, in step S202, the PDL interpretation unit 120 interprets a single PDL command included in the PDL data received in step S201. Namely, the PDL interpretation unit 120 interprets the PDL data per PDL command.

Next, in step S203, the PDL interpretation unit 120 determines whether the PDL command interpreted in step S202 specifies the end of a print job. If the PDL command specifies the end of a job (YES in step S203), the PDL interpretation unit 120 ends the operation.

If the PDL command does not specify the end of a job (NO in step S203), the operation proceeds to step S204. In step S204, the PDL interpretation unit 120 determines whether the PDL command interpreted in step S202 specifies a page break (end).

If the PDL command specifies a page break (YES in step S204), the PDL interpretation unit 120 notifies the DL generation unit 150 that a single page of PDL command has been interpreted (page end notification), via the signal line connecting the PDL interpretation unit 120 and the DL generation unit 150 in FIG. 1. In addition, in step S205, the PDL interpretation unit 120 instructs the rendering unit 170 to start rendering processing after the DL generation unit 150 completes DL generation processing, via the signal line connecting the PDL interpretation unit 120 and the rendering unit 170 in FIG. 1. As a result, the rendering unit 170 generates a bitmap image from the generated one page of DL. Next, the operation returns to step S202, and the PDL interpretation unit 120 starts interpreting the next PDL command included in the PDL data.

If the PDL command is not a command specifying a page break but is a rendering command (NO in step S204), the operation proceeds to step S206. In step S206, the PDL interpretation unit 120 stores the interpretation result of the rendering command in the interpretation result storage unit 130. In this step, the PDL interpretation unit 120 accesses a certain memory address in the memory space in the interpretation result storage unit 130 and sequentially overwrites an old interpretation result with the interpretation result of the rendering command. In this way, the PDL interpretation unit 120 stores the interpretation result in the interpretation result storage unit 130.

Next, in step S207, the PDL interpretation unit 120 suspends (stops) the interpretation of the PDL data.

Next, in step S210, the PDL interpretation unit 120 causes the interpretation result storage unit 130 to copy the interpretation result stored therein and to store the copy in the buffer 143. The copy processing by the interpretation result storage unit 130 will be described below with reference to FIG. 5. When the above copying is completed, the interpretation result storage unit 130 notifies the DL generation unit 150 that the interpretation result has been copied, via the signal line connecting the interpretation result storage unit 130 and the DL generation unit 150 in FIG. 1. In addition, the interpretation result storage unit 130 sends an instruction to resume the interpretation of the PDL data to the PDL interpretation unit 120, via the signal line connecting the interpretation result storage unit 130 and the PDL interpretation unit 120 in FIG. 1.

In step S211, the PDL interpretation unit 120 receives the instruction for resumption of the interpretation of the PDL data from the interpretation result storage unit 130 and resumes the interpretation of the PDL data. Next, the operation returns to step S202, and the PDL interpretation unit 120 starts interpretation of the next PDL command.

In parallel with the above processing flow, the DL generation unit 150 asynchronously generates a DL from the copy of the interpretation result stored in the buffer 143.

<Copy of Interpretation Result>

As illustrated in FIG. 5, if an interpretation result includes an address indication pointer, the processing for copying the interpretation result of the rendering command includes processing for changing a memory address indicated by the pointer. Such processing for changing a memory address requires time. Next, the processing for changing the memory address will be described.

There are cases where the data structure of an interpretation result stored in the interpretation result storage unit 130 is a link structure including pointers for indicating addresses in the data. For example, as in the Bezier curve in FIG. 2, a case will be considered where an interpretation result is data representing a plurality of lines, and data representing each line includes a pointer indicating a memory address of data representing another line. When attention is confined to data 1 and data 2 representing two respective lines, for example, as illustrated in FIG. 5, in order to refer to data 2, data 1 has a pointer P indicating memory address A1 of data 2 in the memory space in the interpretation result storage unit 130.

If an interpretation result has such data structure, the following processing is executed in the interpretation result copy processing. A value of data 1 and a value of data 2 are copied in the memory space in the buffer 143, and the memory address indicated by the pointer of data 1 is changed to memory address A2 of data 2 in the memory space in the buffer 143. A longer link structure causes larger load on the copy processing. Namely, more time is required for the copy processing. For example, many rendering commands for curves have such data structures requiring more time for the copy processing. Since the interpretation result of a rendering command for a curve results in a plurality of simple lines, processing for generating a DL from each line requires only small load. Thus, the DL generation processing does not require much time.

Next, the DL generation processing to be executed asynchronously will be described.

<Generation of DL>

FIG. 4 is a flowchart of DL generation processing by the DL generation unit 150.

When the DL generation unit 150 receives a notification from the PDL interpretation unit 120 in step S205 or from the interpretation result storage unit 130 in step S210, in step S301, the DL generation unit 150 determines whether an interpretation result that has not been processed by the DL generation unit 150 is stored in the buffer 143.

If an unprocessed interpretation result is stored (YES in step S301), the operation proceeds to step S302. In step S302, if a plurality of unprocessed interpretation results is stored, the DL generation unit 150 generates DLs one by one from the unprocessed interpretation results stored in the buffer 143 in the order that the interpretation results were stored in the buffer 143. The DL generation unit 150 stores the DLs one by one in the order that the DLs have been generated in a DL storage unit (not illustrated). The DL generation unit 150 receives the next unprocessed interpretation result after generating a DL from a single unprocessed interpretation result.

After generating a DL from a single interpretation result, in step S303, the DL generation unit 150 deletes the interpretation result from the buffer 143.

These steps S301 to S303 are repeated until all the unprocessed interpretation results are deleted from the buffer 143. If no unprocessed interpretation result is stored in the buffer 143 (NO in step S301), the operation proceeds to step S304. In step S304, the DL generation unit 150 determines whether the DL generation unit 150 has received a notification from the PDL interpretation unit 120 in step S205 (page end notification). If the DL generation unit 150 has not received the page end notification (NO in step S304), according to the present exemplary embodiment, it is assumed that the DL generation unit 150 has received a notification of completion of copying the interpretation result in step S205. Thus, the DL generation unit 150 ends the operation. If the DL generation unit 150 determines the reception of the page end notification (YES in step S304), the operation proceeds to step S305. In step S305, the DL generation unit 150 notifies the rendering unit 170 of completion of generation of one page of DL and sequentially transmits one page of DL stored in the DL storage unit (not illustrated) to the rendering unit 170.

As described above, the printer controller according to the first exemplary embodiment causes the PDL interpretation unit 120 to analyze PDL commands one by one included in PDL data and to store an interpretation result per command in the interpretation result storage unit 130. When an interpretation result corresponding to a single command is stored in the interpretation result storage unit 130, the interpretation result is copied and stored in the buffer 143. Next, the PDL interpretation unit 120 analyzes the next PDL command, and in parallel to this operation, the DL generation unit 150 generates a DL from the copy of the interpretation result stored in the buffer 143. Namely, the PDL data interpretation processing by the PDL interpretation unit 120 and the DL generation processing by the DL generation unit 150 are executed independently and asynchronously.

As described above, the printer controller according to the present exemplary embodiment copies an interpretation result in a buffer. In this way, since delay in the DL generation processing does not delay the PDL data interpretation processing, the PDL data interpretation processing can be executed efficiently.

In the printer controller according to the first exemplary embodiment, a copy of a PDL command interpretation result is stored in the buffer 143. However, in a printer controller according to a second exemplary embodiment, whether to make a copy of a PDL command interpretation result in the buffer 143 is determined and a copy of the interpretation result is made on the basis of the determination. Reasons why these operations are executed will be described below.

When an interpretation result includes an address indication pointer, processing for copying a PDL command interpretation result, particularly a rendering command interpretation result, includes processing for changing the memory address indicated by the pointer. This memory address change processing requires time as described with reference to FIG. 5. Such data configuration requires much time for copy processing, and as a result, an overall processing efficiency may be deteriorated. Thus, if such data structure is present, copy processing can be omitted.

In contrast to these rendering commands, for example, an interpretation result of a font rendering command is an index number specifying a font glyph (shape). Thus, since no pointer needs to be changed, processing for copying the interpretation result requires small load. However, when a DL is generated from the interpretation result, since processing for extracting the contour of the glyph (the contour of the object) is executed, processing for generating a DL from the interpretation result requires large load.

For the reason described above, the printer controller according to the present exemplary embodiment determines whether to execute the interpretation result copy processing on the basis of the amount of the load required for the copy processing.

<Configuration of Printer Controller According to Second Exemplary Embodiment>

The printer controller according to the present exemplary embodiment differs from the printer controller according to the first exemplary embodiment in that the PDL interpretation unit 120 determines whether to copy a PDL data interpretation result, and in that the interpretation result is copied in accordance with the determination.

The PDL interpretation unit 120 according to the present exemplary embodiment executes processing of a flowchart illustrated in FIG. 6.

Other units are the same as those according to the first exemplary embodiment, unless otherwise described.

<Operation of Printer Controller>

An operation of the printer controller according to the second exemplary embodiment, particularly an operation of the PDL interpretation unit 120, will be described with reference to the flowchart in FIG. 6.

<Interpretation of PDL Data>

FIG. 6 is a flowchart illustrating PDL data interpretation processing executed by the PDL interpretation unit 120 and the interpretation result storage unit 130.

Steps S601 to S607 are the same as steps S201 to S207.

In step S608, the interpretation result storage unit 130 determines whether to copy the interpretation result stored in the interpretation result storage unit 130 in the buffer 143. The determination method will be described below with reference to FIG. 7.

In step S608, if the interpretation result storage unit 130 determines that the interpretation result storage unit 130 does not copy the interpretation result (NO in step S608), the interpretation result storage unit 130 causes the DL generation unit 150 to execute the flowchart illustrated in FIG. 4. In step S609, the interpretation result storage unit 130 causes the DL generation unit 150 to generate a DL from the interpretation result stored in the interpretation result storage unit 130. More specifically, the interpretation result storage unit 130 executes the following processing.

The interpretation result storage unit 130 determines whether all the interpretation results stored in the buffer 143 have been processed by the DL generation unit 150 on the basis of the number of interpretation results stored in the buffer 143. Namely, if no interpretation result is stored in the buffer 143, the interpretation result storage unit 130 determines that the DL generation unit 150 has processed all the interpretation results stored in the buffer 143. The interpretation result storage unit 130 determines whether there is no unprocessed interpretation result in the buffer 143 at predetermined time intervals. If the interpretation result storage unit 130 determines that all the interpretation results stored in the buffer 143 have been processed, the interpretation result storage unit 130 causes the DL generation unit 150 to generate a DL from the interpretation result stored in the interpretation result storage unit 130. The interpretation result storage unit 130 notifies this DL generation instruction of the DL generation unit 150 via the signal line connecting the interpretation result storage unit 130 and the DL generation unit 150 in FIG. 1. Accordingly, the DL generation unit 150 generates a DL from the interpretation result stored in the interpretation result storage unit 130. When completing the generation of a DL, the DL generation unit 150 notifies the interpretation result storage unit 130 of completion of generation of the DL. Next, when notified of completion of generation of the DL by the DL generation unit 150, the interpretation result storage unit 130 sends an instruction to resume the interpretation of the PDL data, to the PDL interpretation unit 120.

Next, the operation proceeds to step S611. Since the interpretation result in the interpretation result storage unit 130 according to the present exemplary embodiment is directly accessed by the DL generation unit 150, the interpretation result storage unit 130 can be considered as a storage unit shared by the PDL interpretation unit 120 and the DL generation unit 150.

In step S608, if the interpretation result storage unit 130 determines to copy the interpretation result, the operation proceeds to step S610. In step S610, the PDL interpretation unit 120 causes the interpretation result storage unit 130 to copy the interpretation result stored in the interpretation result storage unit 130 and to store the copy in the buffer 143. The copy processing is the same as that described above with reference to FIG. 5. This copy processing executed by the interpretation result storage unit 130 will be described below with reference to FIG. 5. After making the copy, the interpretation result storage unit 130 notifies the DL generation unit 150 of completion of copying the interpretation result via the signal line connecting the interpretation result storage unit 130 and the DL generation unit 150 in FIG. 1. In addition, the interpretation result storage unit 130 sends an instruction to resume the interpretation of the PDL data, to the PDL interpretation unit 120 via the signal line connecting the interpretation result storage unit 130 and the PDL interpretation unit 120 FIG. 1. Next, the operation proceeds to step S611.

In step S611, the PDL interpretation unit 120 receives the instruction to resume the interpretation of the PDL data from the interpretation result storage unit 130 and resumes the interpretation of the PDL data. Next, the operation returns to step S202, and the PDL interpretation unit 120 starts interpreting the next PDL command.

<Determination of Whether to Copy PDL Interpretation Result in Buffer 143>

Determination processing in step S608 executed by the interpretation result storage unit 130 will be described with reference to flowcharts in FIGS. 7 and 8.

First, the purpose of the determination processing will be described with reference to FIG. 8.

Figure 8A:
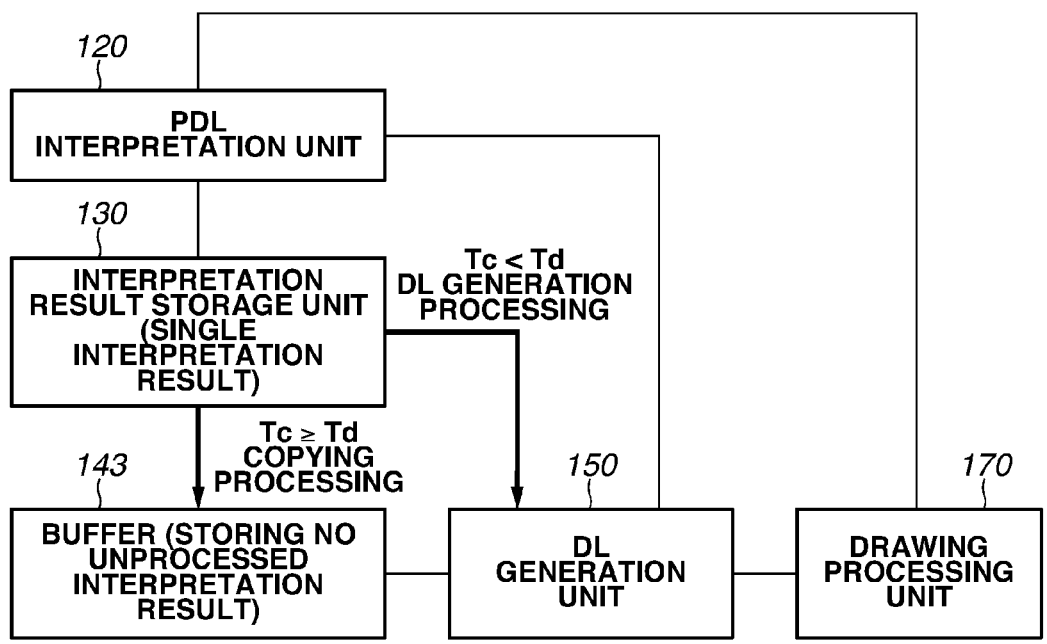
FIGS. 8A and 8B illustrate operations of a printer controller according to a second exemplary embodiment.

FIG. 8A illustrates an operation of determining whether to copy an interpretation result stored in the interpretation result storage unit 130 when the buffer 143 stores no unprocessed interpretation result.

The operation in FIG. 8A uses processing load Tc required for processing of the DL generation unit 150 to generate a DL directly from the interpretation result stored in the interpretation result storage unit 130. In addition, the operation uses processing load Td required for processing for copying the interpretation result stored in the interpretation result storage unit 130 in the buffer 143. Larger processing load requires more processing time. As illustrated in FIG. 8A, if no unprocessed interpretation result is stored in the buffer 143, there are two choices for how the interpretation result stored in the interpretation result storage unit 130 is processed. In one choice, the interpretation result stored in the interpretation result storage unit 130 is copied in the buffer 143 (copy processing). In the other choice, instead of copying the interpretation result stored in the interpretation result storage unit 130 in the buffer 143, a DL is directly generated from the interpretation result (DL generation processing). Since it is desirable that the PDL interpretation unit 120 interpret the next PDL command as soon as possible, the user may select the copy processing or the DL generation processing that can be completed sooner than another processing. Thus, in the case of FIG. 8A, the processing load Tc and the processing load Td are compared with each other, and the processing requiring the smaller processing load is executed.

Figure 8B:
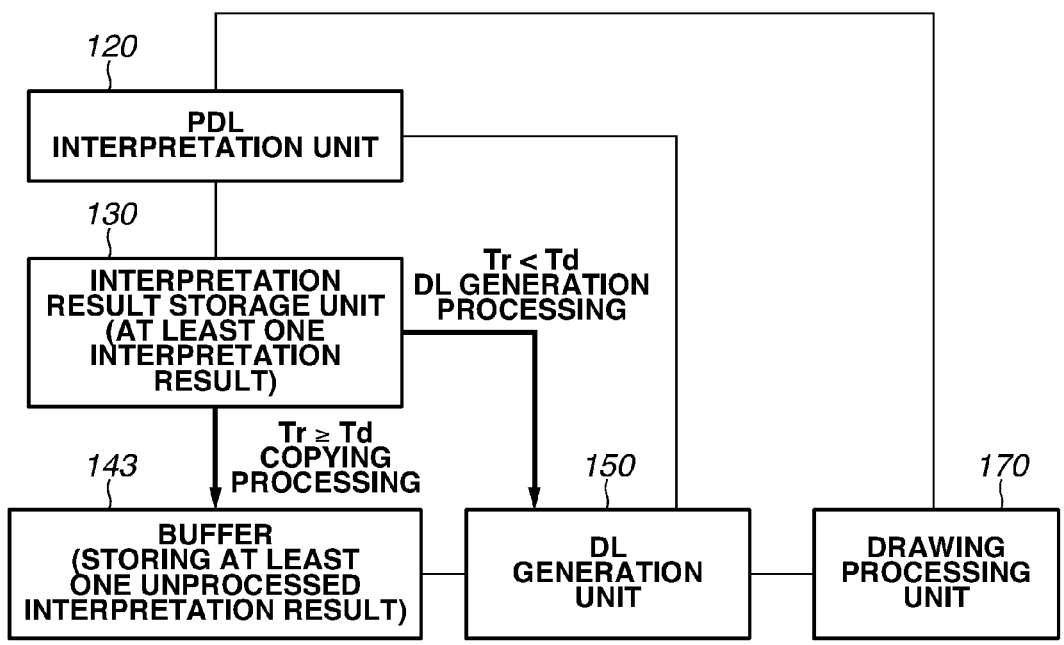
Figure 9:
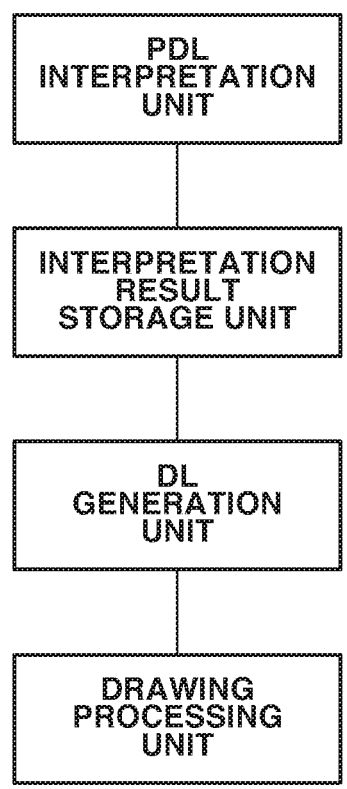
FIG. 9 illustrates processing for generating a DL from PDL data.

In contrast, FIG. 8B illustrates an operation of determining whether to copy an interpretation result stored in the interpretation result storage unit 130 when the buffer 143 stores unprocessed interpretation results.

Processing load Td illustrated in FIG. 8B is the same as that illustrated in FIG. 8A. The operation in FIG. 8B uses processing load Tr required for generating DLs from all the unprocessed interpretation results stored in the buffer 143, as will be described below with FIG. 7. Larger processing load requires more processing time. As illustrated in FIG. 8B, if the buffer 143 stores unprocessed interpretation results, there are two choices for how the interpretation results stored in the interpretation result storage unit 130 are processed. In one choice, the interpretation results stored in the interpretation result storage unit 130 are copied in the buffer 143 (copy processing). In the other choice, after DLs are generated from the unprocessed interpretation results stored in the buffer 143, a DL is directly generated from the interpretation result stored in the interpretation result storage unit 130, instead of copying the interpretation result in the buffer 143 (DL generation processing). When unprocessed interpretation results are stored in the buffer 143, delay is caused in the DL generation processing. Thus, it is desirable that this delay be eliminated as soon as possible. Thus, the user may select the copy processing or the DL generation processing that can be completed sooner than another processing needs to be selected. Thus, in the case of FIG. 8B, the processing load Tr and the processing load Td are compared with each other, and the processing requiring the smaller processing load is executed.

The determination processing based on the processing load will be described with reference to a flowchart in FIG. 7.

First, in step S401, the interpretation result storage unit 130 estimates load (processing cost) required for copying an interpretation result stored in the interpretation result storage unit 130 on the basis of the interpretation result. For example, the interpretation result storage unit 130 calculates the load as a numerical value on the basis of a data size of the interpretation result stored in the interpretation result storage unit 130 or a load coefficient (value) set for each type of rendering command or each type of rendering object created on the basis of the interpretation result. Larger load tends to require more time for copying the interpretation result in the buffer 143. Thus, in other words, the interpretation result storage unit 130 indirectly estimates the processing time.

Generally, if the interpretation result has a larger data size, larger load is required for the copy processing. However, the load of the copy processing can also be increased by other factors. More specifically, for example, many rendering commands specifying Bezier curves such as the one illustrated in FIG. 2 are used to render a curve having a small curvature. In such cases, the interpretation result has a link structure. Thus, a larger load coefficient is set for a rendering command specifying a Bezier curve than a load coefficient for a straight line rendering command according to which an interpretation result that does not have a link structure is generated. In contrast, a relatively small load coefficient is set for a rendering command resulting in copying of a simple interpretation result, such as copying an index number specifying the glyph of a font rendering command.

Next, in step S402, the interpretation result storage unit 130 checks a number of interpretation results stored in the buffer 143 that have not been processed by the DL generation unit 150.

If no unprocessed interpretation result is stored, namely, if the number determined in step S402 is 0 (YES in step S402), the operation proceeds to step S403. In step S403, the interpretation result storage unit 130 estimates the load required by the DL generation unit 150 in generating a DL by processing the interpretation result stored in the interpretation result storage unit 130. Namely, the interpretation result storage unit 130 calculates a processing cost required when the DL generation unit 150 generates a DL from this interpretation result instead of from a copy of this interpretation result. For example, the interpretation result storage unit 130 calculates the load as a numerical value on the basis of a (value) different from the load calculated in step S401. The different load coefficient is predetermined according to the data size of the interpretation result stored in the buffer 143, or according to each type of rendering object created on the basis of the interpretation result. More specifically, in the case of a rendering command for a curve having a small curvature or a rendering command for a dashed line or shading, a relatively short time is required to generate a DL. A smaller load coefficient (value) is set for such a rendering command than those for other rendering commands. In contrast, a larger load coefficient (value) is set for a rendering command requiring a relatively long time to generate a DL from an interpretation result such as a font rendering command than those for other rendering commands.

Next, in step S404, the interpretation result storage unit 130 compares the load estimated in S401 and the load estimated in S403. On the basis of this comparison, the interpretation result storage unit 130 determines which one of the two types of processing causes the larger delay. In this case, the delay corresponding to one type is the delay caused by the copying load estimated in step S401. Namely, the delay is caused by suspension of the interpretation of the PDL data between start of copying the interpretation result in the buffer 143 and completion of the copying. The delay corresponding to the other type is the delay caused by the processing load estimated in step S403, namely, the delay caused by suspension of the interpretation of the PDL data while the DL generation unit 150 is generating a DL by accessing the interpretation result storage unit 130. Namely, the interpretation result storage unit 130 determines which takes more time before resumption of the interpretation of the PDL data, i.e., copying or not copying the interpretation result.

If the load estimated in step S401 is larger than the load estimated in step S403, namely, if the load for copying the interpretation result is larger (YES in step S404), the operation proceeds to step S405. In step S405, the interpretation result storage unit 130 determines not to copy the interpretation result.

If the load estimated in step S401 is equal to the load estimated in step S403 or less, namely, if the load for copying the interpretation result is smaller (NO in step S404), the operation proceeds to step S407. In step S407, the interpretation result storage unit 130 determines to copy the interpretation result.

In step S402, if unprocessed interpretation results are still stored, the operation proceeds to step S406. In step S406, the interpretation result storage unit 130 estimates the load required by the DL generation unit 150 to process all the unprocessed interpretation results. Namely, the interpretation result storage unit 130 calculates a processing cost required for generating DLs from the unprocessed interpretation results that have already been copied in the buffer 143. For example, the interpretation result storage unit 130 estimates a processing load value for each unprocessed interpretation result in the same method as that used in step S403 and calculates the sum of the estimated values. In addition, from the above calculated sum, the interpretation result storage unit 130 subtracts a value of processing load processed by the DL generation unit 150 between when the DL generation unit 150 receives a copy of an interpretation result stored in the buffer 143 and when the interpretation result storage unit 130 calculates the processing load in step S406. Next, in step S404, the interpretation result storage unit 130 compares the load estimated in step S401 and the load estimated in step S406 to determine whether to copy the interpretation result.

On the basis of the comparison, the interpretation result storage unit 130 determines which one of the two types of processing causes the larger delay. In this case, the delay corresponding to one type is the delay caused by the copying load estimated in step S401. Namely, the delay is caused in a period after the DL generation unit 150 copies the interpretation result in the buffer 143 until a DL is generated from the interpretation result stored in the buffer 143. The delay corresponding to the other type is the delay caused by the processing load estimated in step S406. Namely, the delay is caused in a period after when the DL generation unit 150 generates DLs from the unprocessed interpretation results by accessing the buffer 143 and until a DL is generated from the interpretation result stored in the interpretation result storage unit 130. Namely, the interpretation result storage unit 130 determines which takes more time, i.e., copying or not copying the interpretation result to generate a DL from the interpretation result?.

<Mathematical Expression for Estimating Load>

For example, the following mathematical expression can be used to calculate the load Td in step S401.

$$Td=Kd \cdot S+Cd(\text{obj})$$

This mathematical expression includes coefficient Kd that depends on a hardware processing capability of the interpretation result storage unit 130. The higher hardware processing capability the interpretation result storage unit 130 has, the smaller coefficient is set. In addition, the mathematical expression includes data size S of the interpretation result to be copied. In addition, the mathematical expression includes a constant value Cd(obj) that is defined for each obj indicating a rendering object type and that depends on a hardware processing capability of the interpretation result storage unit 130. The higher hardware processing capability the interpretation result storage unit 130 has, the smaller constant value is set.

In addition, for example, the following mathematical expression can be used to calculate the load Tc in step S403.

$$Tc=Kc(\text{obj}) \cdot S+Cc(\text{obj})$$

This mathematical expression includes coefficient Kc(obj) that is defined for each obj indicating a rendering object type and that depends on a hardware processing capability of the DL generation unit 150. The higher hardware processing capability the DL generation unit 150 has, the smaller coefficient is set. In addition, the mathematical expression includes data size S of the interpretation result to be processed. In addition, the mathematical expression includes constant value Cc(obj) that is defined for each obj indicating a rendering object type and that depends on a hardware processing capability of the DL generation unit 150. The higher processing capability the DL generation unit 150 has, the smaller coefficient is set. Next, the reason for defining coefficient Kc for each rendering will be described. For example, if the rendering object is image data, the data size S thereof tends to be larger than that of a rendering object of a different type. However, the load (time) required by the DL generation unit 150 to process image data is relatively small compared with that required for a rendering object of a different type. Thus, the load Tc can be estimated more accurately if a coefficient is defined which is multiplied by the data size of the rendering object to be processed for each rendering object.

In addition, for example, the following mathematical expression can be used to the calculate load Tr in step S406.

$$Tr=\Sigma Tc-Tf$$

This mathematical expression includes the sum ΣTc of the above load Tc of the unprocessed interpretation results copied in the buffer 143. In addition, the mathematical expression includes time Tf that is a period from when the DL generation unit 150 starts processing an interpretation result being processed until when step S406 is executed.

Namely, on the basis of information used for determining whether to copy the data (interpretation result) stored in the interpretation result storage unit 130 in the buffer 143, the interpretation result storage unit 130 determines whether to copy the data in the buffer 143. In this example, the information is the calculated values of the load amounts required for the respective types of processing.

As described above, from the interpretation result stored in the interpretation result storage unit 130, the interpretation result storage unit 130 estimates the load required for the copy processing executed by the interpretation result storage unit 130 and the load required for the DL generation processing executed by the DL generation unit 150. Thus, the load based on the type of the object to be rendered can be estimated accurately. In addition, if no unprocessed interpretation result is stored in the buffer 143, the interpretation result storage unit 130 can determine whether to copy the interpretation result to start interpretation of the next PDL data as soon as possible.

In addition, according to the present exemplary embodiment, each load Td, Tc, and Tr is defined by a single expression, irrespective of the type of the object to be rendered. However, for example, an expression for estimating each load may be defined per rendering object type.

The estimated load Td corresponds to the time required for copying the interpretation result stored in the interpretation result storage unit 130 in the buffer 143. In other words, the load Td estimated when no unprocessed interpretation result is stored in the buffer 143 corresponds to the delay time caused by execution of the copy processing until the next PDL command in the PDL data is interpreted.

The load Tc estimated when no unprocessed interpretation result is stored in the buffer 143 corresponds to the time required for generating a DL directly from the interpretation result stored in the interpretation result storage unit 130. In other words, the load Tc corresponds to the delay time caused by directly executing the DL generation processing until the interpretation of the next PDL command in the PDL data is resumed.

If no unprocessed interpretation result is stored in the buffer 143, the load Td and the load Tc corresponding to these two types of delay time are compared with each other, and the processing causing the less delay is selected. Thus, when no unprocessed interpretation result is stored in the buffer 143, the PDL interpretation unit 120 can quickly resume the PDL data interpretation processing.

The load Td estimated when unprocessed interpretation results are still stored in the buffer 143 corresponds to the shortest delay time caused by execution of the copy processing at least until generation of a DL from an interpretation result copied in the buffer 143 is started.

In addition the load Tr estimated when unprocessed interpretation results are still stored in the buffer 143 corresponds to the time required until generation of a DL from an unprocessed interpretation result stored in the buffer 143 is completed. In other words, the load Tr corresponds to the delay time caused until generation of a DL directly from the interpretation result stored in the interpretation result storage unit 130 is started.

If unprocessed interpretation results are stored in the buffer 143, the load Td and the load Tr corresponding to these two types of delay time are compared with each other, and the processing requiring less delay is selected. Thus, when unprocessed interpretation results are stored in the buffer 143, the DL generation unit 150 can quickly start the DL generation processing. The sooner the generation of a DL is started, the sooner the generation of the DL is completed. Namely, the DL generation unit 150 can quickly complete generation of the DL.

In the above present exemplary embodiment, the interpretation result storage unit 130 determines whether to execute the interpretation result copy processing by calculating and comparing the processing load Td, Tc, and Tr. However, the determination may be made on the basis of another method.

For example, the determination may be made only on the basis of the processing cost (load Td) required for the interpretation result copy processing. In such a case, if the load Td exceeds a predetermined threshold, the PDL interpretation unit 120 controls the interpretation result storage unit 130 not to execute the copy processing and the DL generation unit 150 to generate a DL. In contrast, if the load Td is the predetermined threshold or less, the PDL interpretation unit 120 controls the interpretation result storage unit 130 to execute the copy processing and the DL generation unit 150 to generate a DL.

Alternatively, for example, the determination may be made only on the basis of the processing cost (load Tc) required for generating a DL from an interpretation result. In such a case, if the load Tc exceeds a predetermined threshold, the PDL interpretation unit 120 controls the interpretation result storage unit 130 to execute the copy processing and the DL generation unit 150 to generate a DL. In contrast, if the load Tc is the predetermined threshold or less, the PDL interpretation unit 120 controls the interpretation result storage unit 130 not to execute the copy processing and the DL generation unit 150 to generate a DL.

Alternatively, for example, the determination may be made only on the basis of the processing cost (load Tr) required for generating a DL from an unprocessed interpretation result stored in the buffer 143. In such a case, if the load Tr exceeds a predetermined threshold, the PDL interpretation unit 120 controls the interpretation result storage unit 130 to execute the copy processing and the DL generation unit 150 to generate a DL. In contrast, if the load Tr is the predetermined threshold or less, the PDL interpretation unit 120 controls the interpretation result storage unit 130 not to execute the copy processing and the DL generation unit 150 to generate a DL.

Alternatively, for example, whether to copy an interpretation result may be determined as follows, without calculating each of the processing costs (loads Td, Tc, and Tr) described in the present exemplary embodiment. If the interpretation result stored in the interpretation result storage unit 130 has a data size that exceeds a predetermined threshold, the PDL interpretation unit 120 controls the interpretation result storage unit 130 not to execute the copy processing and the DL generation unit 150 to generate a DL. In contrast, if the interpretation result has a data size that corresponds to the predetermined threshold or less, the PDL interpretation unit 120 controls the interpretation result storage unit 130 to execute the copy processing and the DL generation unit 150 to generate a DL. In such a case, the predetermined threshold is used as the information for determining whether to copy the interpretation result.

Alternatively, the determination may be made on the basis of the type of the rendering command or the type of the rendering object to be created in accordance with the interpretation result. In such a case, a table is used in which certain types of rendering commands or rendering objects among the rendering command types or the rendering object types are described. If a rendering command matches the table (if the type of the rendering command matches a certain type), the PDL interpretation unit 120 controls the interpretation result storage unit 130 not to execute the copy processing and the DL generation unit 150 to generate a DL. In contrast, if the interpretation result does not match the table, the PDL interpretation unit 120 controls the interpretation result storage unit 130 not to execute the copy processing and the DL generation unit 150 to generate a DL. In such a case, the table is used as the information for determining whether to copy the interpretation result. For example, when this table includes a shading rendering command, if the rendering command is a font rendering command, the interpretation result storage unit 130 executes the interpretation result copy processing. If the rendering command is a shading rendering command, the interpretation result storage unit 130 does not execute the interpretation result copy processing.

<Other Exemplary Embodiments>

While the interpretation result storage unit 130 and the buffer 143 are configured on different hardware modules in the printer controllers according to the above exemplary embodiments, the interpretation result storage unit 130 and the buffer 143 may be configured on a single hardware module. In such a case, a single memory of the hardware module, such as a random access memory (RAM), can be configured to function as a memory having a fixed size storage area included in the interpretation result storage unit 130 and a memory having a fixed-size storage area included in the buffer 143. This is one of the other exemplary embodiments.

Other exemplary embodiments will be described. In the printer controllers according to exemplary embodiments, each of the processing for interpreting PDL data, the processing for copying an interpretation result, and the processing for generation a DL from the interpretation result is executed by an independent and dedicated hardware module. However, general-purpose arithmetic units such as central processing units (CPUs) may be allowed to execute the same processing as the processing executed by PDL interpretation unit 120, the interpretation result storage unit 130, the buffer 143, and the DL generation unit 150 according to the above exemplary embodiments.

For example, assuming that a printer controller has a read-only memory (ROM), a RAM, and two CPUs, one (CPU1) of the CPUs is configured to execute the processing of the PDL interpretation unit 120, the interpretation result storage unit 130, and the buffer 143. While the CPU1 is executing the above processing, another CPU (CPU2) is configured to execute the processing of the DL generation unit 150. During the processing, the CPU1 reads a program for executing the processing of the PDL interpretation unit 120, the interpretation result storage unit 130, and the buffer 143 from the ROM and executes the program. In addition, the CPU2 reads a program for executing the processing of the DL generation unit 150 from the ROM and executes the program. In such a case, the RAM functions as a storage area for each of the interpretation result storage unit 130 and the buffer 143. The storage area functioning as the interpretation result storage unit 130 and the storage area functioning as the buffer 143 do not overlap with each other.

In addition, this processing may be executed on the basis of threads per PDL command. In this way, it is possible to configure a printer controller such that, while the CPU1 is interpreting a PDL command, the CPU2 can generate a DL from another interpretation result. Since the processing may be executed on the basis of threads, it is possible to configure the printer controller such that, while the CPU2 is interpreting a PDL command, the CPU1 can generate a DL from another interpretation result.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-151655 filed Jul. 22, 2013, which is hereby incorporated by reference herein in its entirety.

What is claimed is:

1. A display list generation apparatus, comprising:
a first memory;
a second memory; and
a processor in communication with the first memory and the second memory, wherein the processor performs:
interpreting page description language (PDL) data:,
storing a result of an interpretation of the PDL data in the first memory;

copying the result of the interpretation from the first memory to the second memory in a case where a data size of the result of the interpretation does not exceeds a threshold;

generating a display list from the copy of the result of the interpretation stored in the second memory in a case where the data size of the result of the interpretation does not exceed the threshold; and generating a display list from the result of the interpretation stored in the first memory in a case where the data size of the result of the interpretation exceeds the threshold, wherein the generation of the display list from the result of the interpretation stored in the first memory is performed after the processor has generated the display list from all results of interpretation which are stored in the second memory until then.

2. The apparatus according to claim 1, wherein the processor does not copy, from the first memory to the second memory, the result of the interpretation having a data size exceeding the threshold and stored in the first memory.

3. The apparatus according to claim 1, wherein the processor further performs:

generating bitmap data of a page based on the generated display list; and causing a printing engine to print an image based on the generated bitmap data.

4. A display list generation method, comprising:

interpreting page description language (PDL) data;

storing a result of an interpretation of the PDL data in a first memory;

copying the result of the interpretation from the first memory to a second memory in a case where a data size of the result of the interpretation does not exceed a threshold;

generating a display list from the copy of the result of the interpretation stored in the second memory in a case where the data size of the result of the interpretation does not exceed the threshold; and generating a display list from the result of the interpretation stored in the first memory in a case where the data size of the result of the interpretation exceeds the threshold, wherein the generation of the display list from the result of the interpretation stored in the first memory is performed after generating the display list from all results of interpretation which are stored in the second memory until then.

5. The method according to claim 4, wherein the result of the interpretation having a data size exceeding the threshold and stored in the first memory is not copied from the first memory to the second memory.

6. The method according to claim 4, further comprising:

generating bitmap data of a page based on the generated display list; and printing an image based on the generated bitmap data.

7. A non-transitory computer-readable storage medium storing a computer program that causes a computer to perform:

interpreting page description language (PDL) data;

storing a result of an interpretation of the PDL data in a first memory;

copying the result of the interpretation result from the first memory to a second memory in a case where a data size of the result of the interpretation does not exceed a threshold;

generating a display list from the copy of the result of the interpretation stored in the second memory in a case where the data size of the result of the interpretation does not exceed the threshold; and generating a display list from the result of the interpretation stored in the first memory in a case where the data size of the result of the interpretation exceeds the threshold, wherein the generation of the display list from the result of the interpretation stored in the first memory is performed after generating the display list from all results of interpretation which are stored in the second memory until then.

\* \* \* \* \*